April 2, 1940.  T. W. BRIEGEL  2,195,559
COMPRESSION-TYPE FITTING
Filed Aug. 4, 1939
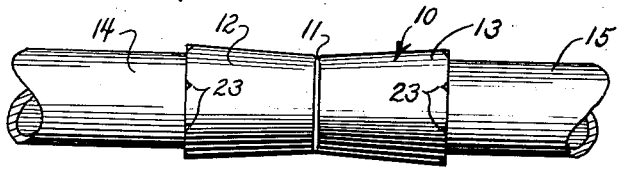
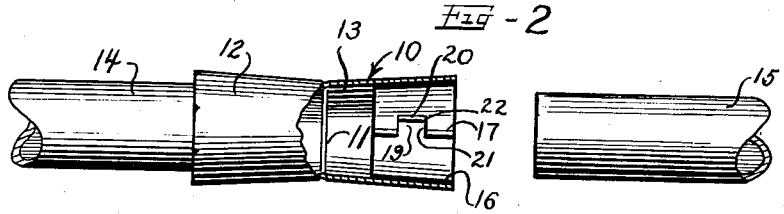
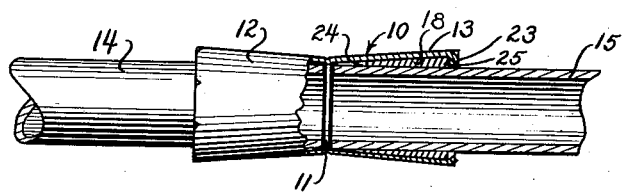
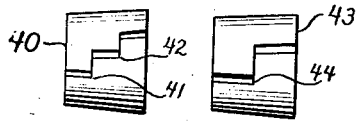
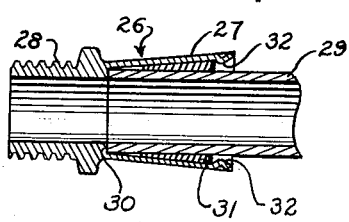
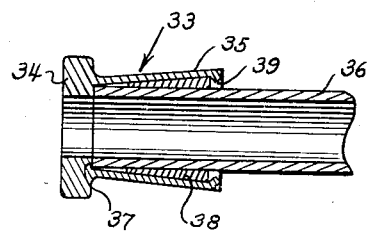
Inventor
THEODORE W. BRIEGEL
by Charles O'Neill Attys Patented Apr. 2, 1940

2,195,559

UNITED STATES PATENT OFFICE 2,195,559

COMPRESSION-TYPE FITTING

Theodore W. Briegel, Galva, Ill.

Application August 4, 1939, Serial No. 288,309

1 Claim. (Cl. 285—182.1)

This invention relates to a compression-type fitting and to a method of assembling the same on conduits and the like. More particularly the invention relates to a connector for electrical conduits and to a means and method for wedgingly assembling the connector and conduits together.

It has heretofore been customary in compression-type fittings to provide a nut having a threaded tapered portion for effecting a wedging engagement between a fitting or connector and an end of a conduit, tubing or the like. Such a nut is relatively unsightly in that it is necessarily of larger diameter than the fitting and makes the same look bulky when assembled in a line of conduits.

It is therefore an important object of the present invention to provide a compression-type fitting that eliminates the necessity of using a threaded nut and that may be manufactured at lower cost than the nut type of fitting.

It is a further important object of this invention to provide a compression-type fitting of simple construction, easy to assemble in place on a conduit and imparting a pleasing, streamlined appearance thereto.

It is a further important object of this invention to provide a simple method of assembling a compression-type fitting and conduit, tubing or the like, whereby the same may be held firmly and permanently together without the use of threaded connection.

Other and further important objects of this invention will be apparent from the disclosures in the specification and the accompanying drawing.

This invention (in a preferred form) is illustrated in the drawing and hereinafter more fully described.

On the drawing:

Figure 1 is a plan view of a compression type of fitting and conduit assembly embodying the principles of my invention.

Figure 2 is a plan view, partly in section, illustrating the manner of assembling the fitting and conduit.

Figure 3 is a plan view, partly broken away and in section, showing the completed assembly.

Figure 4 is a longitudinal sectional view of a modified form of fitting assembled on a conduit end.

Figure 5 is a longitudinal sectional view of a further modification of my fitting, assembled on a conduit end.

Figure 6 is an elevational view illustrating an additional form of a split wedge-shaped sleeve embodying the principles of my invention.

Figure 7 is an elevational view illustrating still another form of a split wedge-shaped sleeve embodying the principles of my invention.

As shown on the drawing:

The reference numeral 10 indicates generally a fitting (Figs. 1, 2 and 3) embodying the principles of my invention. Said fitting comprises a sleeve of some suitable material, such as steel, having its mid-portion constricted annularly as at 11 to provide a stop for the ends of conduit, tubing or the like, on which the fitting is to be assembled. The fitting 10 is flared outwardly from the annular constricted portion 11 to provide hollow conical portions 12 and 13, the walls of which are relatively thin for a purpose later to be disclosed. The taper of the conical end portions 12 and 13 may be made comparatively slight so as not to materially increase the diameter of the fitting beyond that of the conduit or tubing.

As illustrated, the ends of conduits, tubing or the like, indicated generally by the reference numerals 14 and 15, are adapted to be inserted into the outwardly flared portions 12 and 13, respectively, until the ends of said conduits abut the annular stop 11. Prior to such insertion of the ends of the conduits 14 and 15, a split wedge-shaped sleeve 16, of which only one is shown, is placed in each end of the conical portions 12 and 13 (Fig. 2). Owing to the fact that said sleeve 16 is normally of greater outside diameter than the inside diameter of either of the flared portions 12 or 13, and must therefore be contracted when inserted thereinto, the split sleeve, after its insertion, is held in place by frictional engagement between the contacting surfaces of the sleeve and fitting. Each of said sleeves 16 is slit longitudinally, as at 17, to provide for the requisite amount of expansion and contraction and is formed with an outer surface 18 that is tapered to conform with the taper of the flared portions 12 and 13. It is also preferable to provide each of the split sleeves 16 with a cooperating tongue 19 and groove 20 adapted to interfit closely along their annularly extending edges 21 and 22, respectively.

Other forms of split, wedge-shaped sleeves are illustrated in Figs. 6 and 7, in the former of which is shown a sleeve 40 having a series of stepped interfitting cuts 41 and 42, and the latter of which shows a sleeve 43 having a single stepped cut 44. Any of these various types of split, wedge-shaped sleeves, wherein the annularly extending edges, such as the edges 21 and 22 are in close fitting relationship, suffice to make the assembly water and moisture tight when the split wedge-shaped sleeve is driven home in the manner about to be described.

In assembling the fitting and conduit shown in Figs. 1 to 3 inclusive, the ends of the conduits 14 and 15 are inserted into the respective ends 12 and 13 of the fitting 10 until such ends abut the annular stop 11. The split, wedge-shaped sleeves 16, which had previously been positioned loosely within the flared end portions 12 and 13, are then forced inwardly toward the annular stop 11, so as to lie wholly within said flared end portions and in tight, wedging engagement with the contacting surfaces thereof and of the conduit end walls.

Portions of the material of said flared ends 12 and 13 are next struck inwardly, as at 23, to engage against the material of the sleeve 16. Preferably, the sleeves 16 are shorter than the length of the flared portions 12 and 13 so as to leave a take-up space 24 at the inner end of each sleeve and so as to permit the indented portions 23 to bear inwardly against the end edges 25 of said sleeves 16.

By this arrangement, when the indentations 23 are struck inwardly, the displacement of the material so indented bears against the end edges 25 of the sleeves 16 and forces them into even tighter wedging engagement, while at the same time permanently assembling the fitting upon the conduit ends. The frictional engagement between the contacting surfaces of the wedge-shaped sleeves 16 and of the conduit ends and fittings is such that a very considerable pull would be necessary to separate the conduit ends, far in excess of any normal pull to which said conduits might be subjected during installation. As stated previously, the walls of the flared portions 12 and 13 are made sufficiently thin so that indented portions 23 can be readily formed by a tool right on the job.

In Fig. 4 there is shown a modification of my fitting, embodying the same principle but serving a different purpose. The modified fitting 26 has but one flared conduit receiving portion 27, the other end being flanged and threaded, as at 28. The end of a conduit 29 is inserted into the flared portion 27 of the fitting 26 until its end abuts against the shoulder 30 formed at the constricted inner end of said flange portion 27. A split, wedge-shaped sleeve 31 is positioned wholly within said flared portion 27 and held therein by means of integral portions 32 struck inwardly from adjacent the outer end edge of the flared portion 27. As described previously, the inwardly struck portions 32 serve more firmly to effect wedging engagement between said sleeve 31, the conduit end 29 and the fitting 26.

In Fig. 5 there is shown a further modified form of fitting 33, serving still a different purpose and having a plane faced flanged end 34 and a flared portion 35. An end of a conduit 36 is inserted into said flared portion 35 until its end edge abuts the inner shoulder 37. A wedge 38 is then forced into place and edge portions of the flared portion 35 are struck inwardly, as at 39, to effect the aforesaid wedging engagement.

It will be understood that various changes may be made in the specific form of the fitting herein illustrated and described without departing from the spirit of my invention. I therefore do not propose to limit my invention otherwise than as necessitated by the prior art and by the claim appended hereto.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A compression-type fitting and smooth walled conduit assembly, comprising a thin metal fitting having an outwardly flared conical wall and provided with a stop at the inner constricted part of said wall, a thin walled metal conduit end inserted within said conical wall against said stop, and a split sleeve positioned wholly within said conical wall with clearance between the inner end of said sleeve and said stop, said sleeve when so positioned having a conical outer surface in conforming contact with said conical wall and having a cylindrical inner surface in conforming contact with the thin walled conduit end, the material of said conical wall being inwardly deformed against the outer end of said sleeve and tending to force the same further inwardly toward said stop into tight frictional engagement between said conical wall and said conduit end, said engagement providing the sole means for holding the assembled parts permanently against displacement.

THEODORE W. BRIEGEL.